Jan. 3, 1961 K. P. BILLNER 2,966,713
MOLDING APPARATUS
Filed Feb. 11, 1954 3 Sheets-Sheet 1
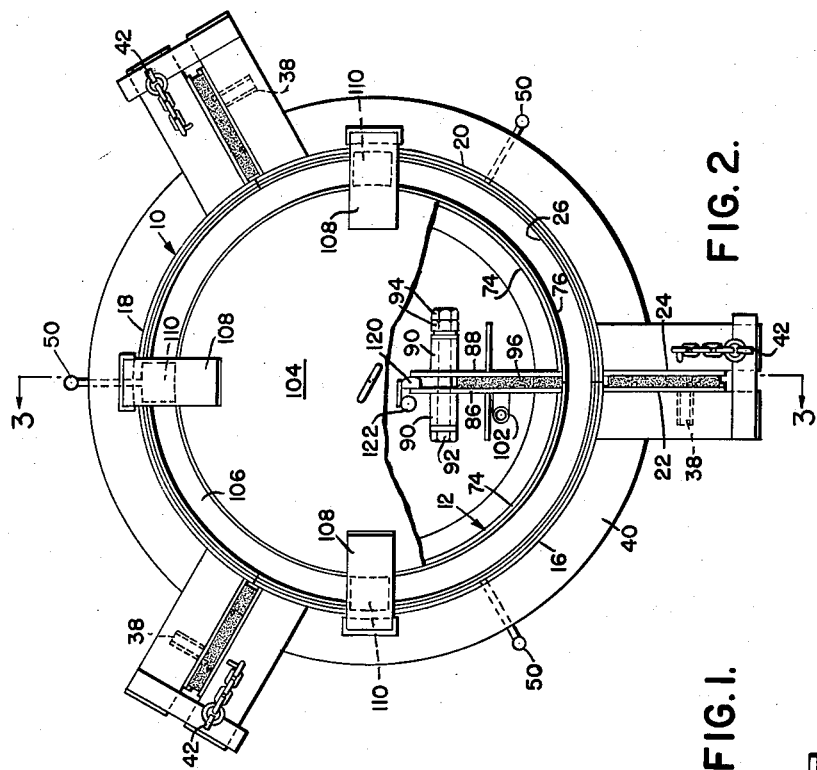
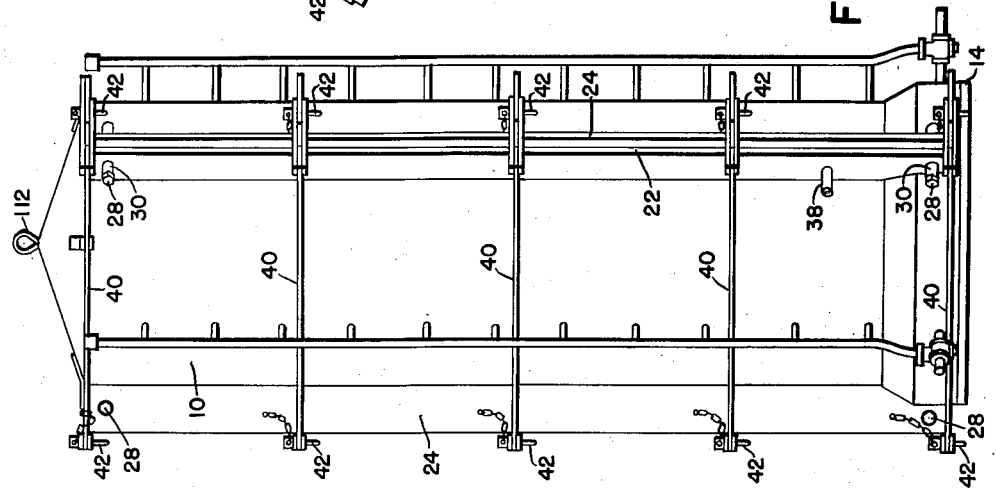
INVENTOR
Karl P. Billner
BY Raymond W. Colton
ATTORNEY Jan. 3, 1961    K. P. BILLNER    2,966,713
MOLDING APPARATUS
Filed Feb. 11, 1954    3 Sheets-Sheet 2

INVENTOR
Karl P. Billner

BY Raymond Wootton
ATTORNEY

Jan. 3, 1961 K. P. BILLNER 2,966,713
MOLDING APPARATUS
Filed Feb. 11, 1954 3 Sheets-Sheet 3

INVENTOR
Karl P. Billner
BY Raymond W Cotton
ATTORNEY

United States Patent Office 2,966,713
Patented Jan. 3, 1961

2,966,713

MOLDING APPARATUS

Karl P. Billner, Philadelphia, Pa., assignor, by mesne assignments, to Vacuum Concrete Corporation of America, Philadelphia, Pa., a corporation of Pennsylvania Filed Feb. 11, 1954, Ser. No. 409,712

12 Claims. (Cl. 25—30)

This invention relates to molding apparatus applicable to the production of concrete pipes, piles, columns, beams, floor and wall slabs, tunnel linings and structures for many other uses.

The apparatus promotes economy in cost and labor in eliminating most of the manipulation required by conventional molding operations which are so wasteful of time in the erection, adjustment and dismantling phases. Moreover, the apparatus of the present invention permits more repeated uses of the same equipment within a given time than is possible with conventional apparatus, thus reducing the required inventory for a given production rate.

In addition, the apparatus contemplated herein provides forms which are water tight, thus eliminating a frequent objection, known as honeycombing, caused by the leakage of liquid from local portions of a plastic concrete body adjacent joints in the form.

The structures contemplated herein are eminently suited for the application of vacuum to remove the vehicle in excess of that required for hydration whereby the molded product becomes self supporting within a very short time permitting removal of the mold for reuse in the next molding operation with a minimum time loss.

The molding apparatus of the present invention comprises a composite form having a plurality of relatively movable wall sections defining a molding surface, a sealing surface provided by each of the sections at less than a straight angle relative to the molding surface, means including a deformable gasket interposed between opposed sealing surfaces of adjacent wall sections defining a substantially fluid tight chamber therebetween, and a fluid conductor communicating with each of the chambers for connection with a source of subatmospheric pressure. In many cases the molding surface is of annular configuration having a convex outer wall and a concave inner wall and in a large number of its applications, the molding surface defines a closed figure. By virtue of the deformable gaskets which are preferably stressed under all conditions, a substantially continuous molding surface is produced when the deformation assumes its maximum degree. The molding surface is moreover preferably expansible and contractible and covered by a layer of flexible material which may be water pervious to permit the extraction of excess vehicle from the plastic mix and/or which may have little affinity for the partially hardened concrete to facilitate separation of portions of the molding apparatus from the molded product.

In many of the applications of this invention the adjacent sections carry flanges substantially normal to the molding surface and the gasket means is interposed between such flanges and is composed of sponge rubber or comparable compressible material having resilient properties. The wall sections are interconnected to prevent excessive separation which may be achieved by directly securing the gasket means thereto and/or by suitably articulating adjacent sections by means of bolts or the like which will also serve to limit separation to prescribed amounts in at least one direction. The inherent resiliency of the gasket means will tend to separate the wall sections so long as there is any compressive stress whatsoever and this effect can be increased by the interposition of springs between the wall sections. Where excess water is to be extracted from the molded body, the molding surface through which such extraction is to be effected will be pervious and will have provision for connection with a source of subatmospheric pressure.

For a large number of the applications of the present invention, there will be both inner and outer forms in which case the inner form will always comprise the relatively movable wall sections already defined. And in most of such applications, the inner and outer forms will be concentrically arranged by the use of suitable spacing means interposed between portions thereof and each of the forms may have a plurality of relatively movable wall sections defining their respective molding surfaces of the types already described. And to facilitate the introduction of the plastic mix between the forms, a downwardly divergent distributing member is contemplated to cover the upper end of the inner form while exposing a portion of the space between the forms, serving at the same time to maintain the upper ends of the two forms in a prescribed spaced relationship.

A more complete understanding of the invention will follow from a description of the accompanying drawings wherein Fig. 1 is an elevation depicting one form of apparatus contemplated;

Fig. 2 is a plan view, partially broken away, and on a somewhat enlarged scale of the apparatus shown in Fig. 1;

Figure 3:
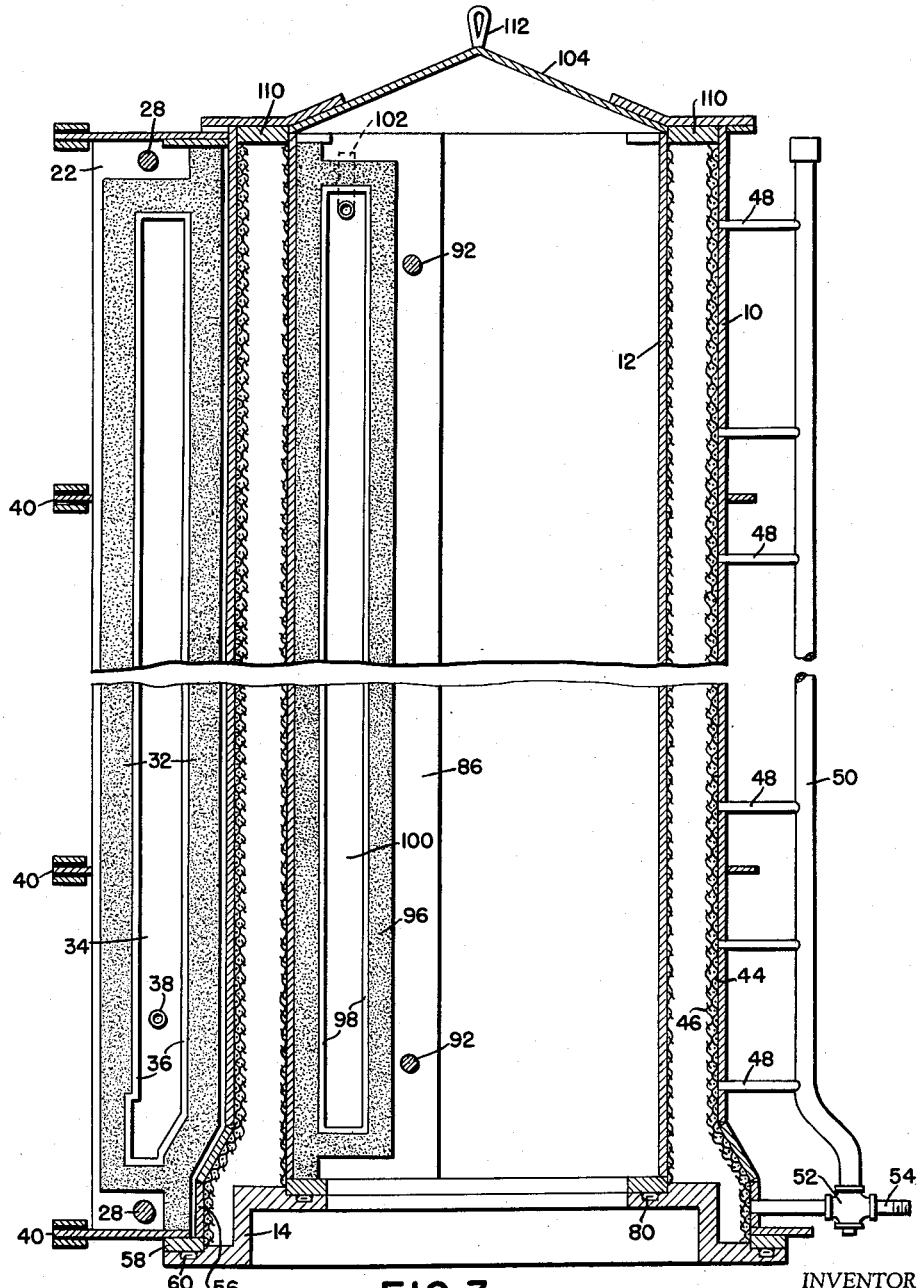
Fig. 3 is a sectional elevation, also on an enlarged scale, taken along line 3—3 of Fig. 2.

The structure depicted in Figs. 1 to 5 inclusive, includes an outer form 10 and an inner form 12 maintained in spaced relationship by means of a base 14. The outer form is composed of three segments, 16, 18 and 20, each extending circumferentially through approximately 120°, terminating in flanges 22 and 24 radially disposed at substantially 90° to the molding surface 26 defined by the segments. The flanges 22 and 24 of adjacent segments extend axially throughout the length of the segments and are articulated by means of bolts 28 slidably received through collars 30 welded to the external surfaces of these flanges.

Figure 4:
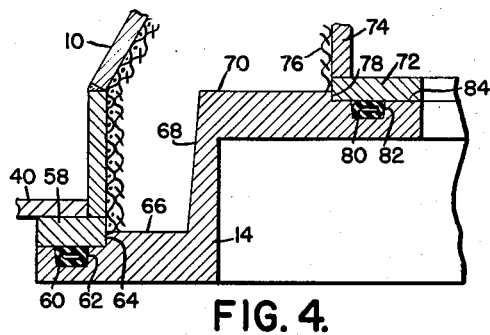
Fig. 4 is a fragmentary sectional elevation on a further enlarged scale depicting a portion of the structure of Fig. 3.

The flange 22 as depicted in Fig. 3 has compressible sponge rubber gasket material 32 secured to its inner surface to define a chamber 34 which becomes a closed chamber in cooperation with the opposed flange 24 of the adjacent segment when the parts are assembled. Suitable bending strips 36 also secured to the flange 22 prevent lateral movement of the gaskets. A nipple 38 provides communication between the chamber 34 and a source of subatmospheric pressure which has not been illustrated. The outer form segments are also provided with spaced radial flanges 40 in such a manner that they assume an overlapping relationship at the longitudinal joints between the segments so that when the outer form as an entirety is contracted prior to the pouring of concrete, suitable openings in these flanges will register permitting the insertion of a locking pin 42 for mechanically holding the parts against undesired movement. These radial flanges further serve to reinforce the outer form segments so as to withstand the hydrostatic forces imposed upon them while the concrete mix is plastic. The outer form segments are first lined with a foraminous layer such as screening 44 which is in turn covered with a layer of canvas or other permeable material 46 that will assure a reasonably smooth surface to the product and through these permeable layers the water in excess of that required for hydration of the concrete can be drawn through tubes 48 constituting a portion of the manifold 50, closed at its upper end and provided with a valve 52 and nipple 54 at its lower end for communication with a source of subatmospheric pressure. As will be evident from Fig. 2 of the drawings, such segment is provided with one of these manifold arrangements. As shown in these figures, the outer form has its lower end 56 of belled configuration terminating in a radial flange 58 which seats on a tubular gasket 60 received in an annular groove 62 formed in the upper surface of the base 14 adjacent a step 64 which serves to limit the degree of contraction of the outer form 10 by engagement with the inner periphery of the flange 58. The gasket 60 is also substantially annular and may be defined by an appropriate length of conventional hose material so long as it defines a water tight joint between the outer form and the base. Extending radially inwardly from the outer form, the base provides an annular surface 66 which will define the bell end of a pipe for which this particular form is designed. Intersecting this annular surface 66 is an upwardly convergent surface 68 which will define the inner surface of the bell of the ultimate pipe, and this surface in turn intersects a radially directed annular surface 70 which will define the shoulder against which the spigot end of a complementary pipe will abut. This surface 70 terminates in abutment with a radially directed flange 72 carried by the lower end of the inner form segment 74, depicted as faced with a covering material 76 which may be a plastic material having little affinity for the hardened concrete so as to facilitate separation when the concrete has become hardened. The radial flange 72 is shown in Fig. 4 as radially abutting a shoulder 78 on the base member, thus limiting the degree of expansion that can be imparted to the inner form. The lowermost surface of the flange 72 engages a tubular annular gasket 80 seated in a groove 82 provided in an upper surface 84 of the base member.

The inner form 12 is also shown as comprising three segments 74 provided with inwardly directed radial flanges 86 and 88 having collars 90 secured thereto, by means of welding, for the reception of bolts 92 whose threaded ends are provided with locking nuts 94 by which the degree of separation of adjacent form sections is limited. As shown in Fig. 3, the flange 86 has its inner surface provided with compressible sponge rubber gasket material 96 retained against lateral movement by means of beads 98 also secured to the flange, forming a chamber 100 which is closed against atmosphere in cooperation with the opposed flange 88 when the segments of the internal form are assembled in the manner depicted in Fig. 2. This chamber is provided with a conductor 102 for communication with a source of subatmospheric pressure.

Whereas the lower ends of the inner and outer forms are maintained in spaced relationship by the base 14, this function for the upper ends of the forms is served by a distributing member 104 of downwardly divergent configuration which covers the upper end of the inner form while leaving exposed the major portion of the upper end 106 of the space between the forms. This is accomplished by four radial projections 108 which extend beyond the periphery of the outer form, as shown in Fig. 2, to the under surfaces of which are secured spacing blocks 110 interposed between the cylindrical walls of the inner and outer forms. A ring 112 is carried by the distributing member to facilitate its removal from the assembly by means of a crane. The form members themselves are likewise provided with suitable lifting devices, not shown, so that they can be removed from their base with facility after the molded concrete mix has hardened.

Figure 5:
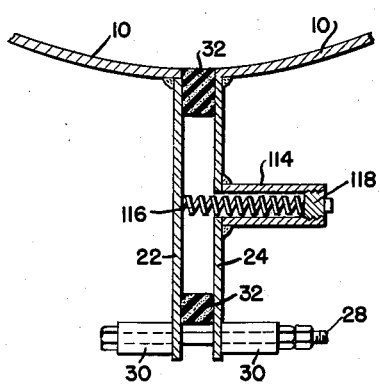
Fig. 5 is a fragmentary section on an enlarged scale depicting a portion of an outer form.

Fig. 5 depicts a fragmentary portion of an outer form wherein a tube 114 is carried by the flange 24 for the reception of a coil spring 116 interposed between the wall of the flange 22 and a plug 118 threadedly received by the projecting end of the tube to impose pressure upon the spring whereby it will assist the gaskets 32 in expanding the outer form when it is desired to remove it from the molded concrete body.

With this understanding of the structure of the apparatus depicted in Figs. 1 to 5 inclusive, it will follow that the manner of its use will proceed somewhat as follows: The inner form will be lowered to its position on the base 14 and its segments will be expanded and maintained in expanded relatoinship by means of a wedge or cam 120 pivoted on a rod 122 for interposition between the flanges 86 and 88 when they are in their separated condition as depisted in Fig. 2. Even when the segments are thus expanded, the gaskets 96 are under stress sufficient to maintain a water tight seal between the segments. Then the outer form will be lowered into position while in its extended condition until its radial flange 58 at its lower end engages the base. The distributing member 104 will next be lowered into place so that its spacer blocks 110 will span the gap between the upper ends of the inner and outer forms. Under these conditions, the parts are assembled in much the condition depicted by Fig. 3 of the drawings with the lower ends of both forms in liquid tight relationship with the space 14 by virtue of the gaskets 60 and 80. Liquid tight seals are also present between the adjacent segments of both forms respectively, since the sponge rubber or equivalent gasket materials are under compression sufficient to assure such seals. Then the nipples 38 of the three outer form segments are connected with a source of subatmospheric pressure, exhausting the chambers 34 and drawing the flanges 22 and 24 towards one another to the extent possible which is limited by the step 64 on the base and the spacer blocks 110 on the distributing member. Then the pins 42 can be inserted to maintain the outer form segments in this position. The concrete is next poured over the distributing member 104 to fill the space between the forms, accompanied by vibration to the extent necessary to compact the material whereupon the nipple 54 of the manifold 50 will be connected with the source of subatmospheric pressure to withdraw the water in excess of that required for hydration through the tubes 48, screening 44 and pervious sheet material 46 so that the concrete will harden within a period of say, ten or thirty minutes, depending upon the conditions selected. In any event, once the molded products become self-supporting, the forms can be removed for use on another product. Removal of the forms is effected after the distributing member 104 has been removed. At that time, the source of subatmospheric pressure will be applied to the nipples 102, exhausting the chambers 100 and further compressing the gasket material 96 as the flanges 86 and 88 are drawn closer together. By virtue of this movement of the form sections, which must of course be preceded by retraction of the spacer strips 120, the periphery of the inner form is reduced to the extent necessary to permit ready withdrawal of the form from the molded concrete product by lifting it upwardly. In order to remove the outer form, the pins 42 are retracted from the registering openings carried by the flanges 40 and if the vacuum between the flanges has been maintained throughout this period, it is removed by admitting atmospheric pressure which should be sufficient under most circumstances for separation of the outer mold sections. Should there be any excessive adhesion however, compressed air can be introduced through the nipples 38 to achieve a separating force necessary to assure removal of the outer form. Then, the outer form is likewise lifted from the product whereupon the two forms and their distributor can be moved on for cooperation with another base 14. Then after the concrete has actually set, the molded product can be removed from its base for storage or immediate use.

Figure 6:
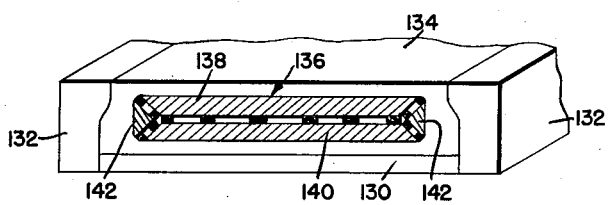
Fig. 6 is an isometric view partially in section illustrating a modification.
Figure 7:
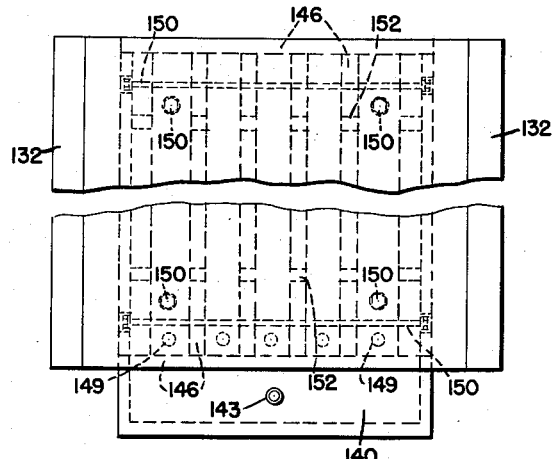
Fig. 7 is a plan view of the structure shown in Fig. 6.
Figure 8:
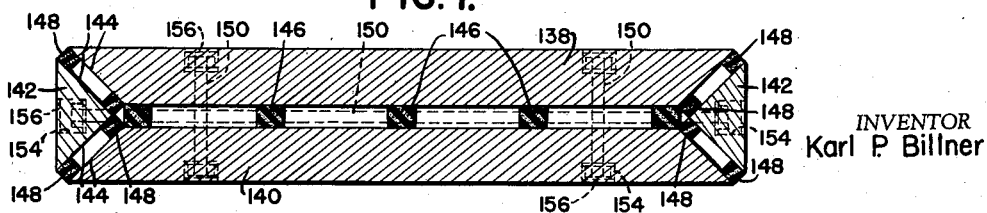
Fig. 8 is a fragmentary sectional elevation on an enlarged scale of the internal form contemplated by the structures of Figs. 6 and 7.

The modification depicted in Figs. 6, 7 and 8 contemplates a more or less conventional outer form made up of a bottom member 130 and side members 132 into which a concrete body 134 is poured about an inner form 136. This inner form is composed of a top member 138, a bottom member 140 opposed thereto, and opposed side members 142, each having scarfed or mitered edges 144. The top and bottom members are maintained in spaced relationship by compressible sponge rubber gaskets 146 or the like, whereas the side members are maintained in spaced relationship with respect to the upper and lower members by means of similar resilient gaskets 148. Slidable bolts 150 extending between the opposed form members maintain the inner form properly assembled. As shown in Fig. 7, the bottom member 140 is extended beyond the outer form to provide a manifold having a nipple 143 connected therewith for communication with a source of subatmospheric pressure. Since the gaskets 146 and 148 completely surround portions between the form elements to define closed chambers, it will follow that when air is withdrawn from the chambers through suitable ports 149 communicating with the manifold, the form elements will be drawn towards one another, compressing the gaskets and contracting the form as an entirety both vertically and horizontally so that it can be withdrawn readily from the hardened concrete body. The chambers defined by the gaskets between the form members are interconnected by means of short channels 152 provided at intervals through the gaskets 146, so that the subatmospheric pressure produced will be uniform throughout the chambers. The collapsible form of Figs. 6, 7 and 8, adapts itself eminently to the production of wall and floor panels among the many other hollow concrete bodies for which it is suited. As depicted by broken lines in Fig. 8, the heads and nuts of the bolts 150 are slidably received in counterbores 154, which are closed by plugs 156 flush with the form surfaces so as to present a substantially unbroken surface to the plastic body to be molded.

Although only two specific forms of the invention have been illustrated and described, many variations have occurred to the inventor as falling within the scope of the appended claims.

I claim:

1. Molding apparatus comprising a composite form having a plurality of relatively movable wall sections defining a molding surface, a sealing surface provided by each of said sections at less than a straight angle relative to said molding surface, means including a deformable gasket interposed between and abutting opposed sealing surfaces of adjacent wall sections defining a substantially fluid tight chamber therewith, and a fluid conductor communicating with each said chamber for connection with a source of subatmospheric pressure.

2. Molding apparatus as set forth in claim 1 wherein said molding surface is annular.

3. Molding apparatus as set forth in claim 1 wherein said molding surface defines a closed figure.

4. Molding apparatus as set forth in claim 1 wherein said molding surface is substantially continuous when said gasket means is deformed.

5. Molding apparatus as set forth in claim 1 wherein said adjacent sections carry flanges substantially normal to said molding surface and said gasket means is interposed between said flanges.

6. Molding apparatus as set forth in claim 1 wherein said gasket means is compressible.

7. Molding apparatus as set forth in claim 1 wherein said adjacent wall sections are interconnected to prevent excessive separation.

8. Molding apparatus as set forth in claim 1 wherein adjustable restraining members interconnect adjacent wall sections to limit their relative movement in at least one direction.

9. Molding apparatus as set forth in claim 1 wherein said means includes spring means resiliently biasing said adjacent wall sections towards separation.

10. Molding apparatus comprising inner and outer forms, said inner form having a plurality of relatively movable wall sections defining a molding surface, compressible resilient gasket means interposed between and abutting opposed portions of adjacent wall sections defining a substantially fluid tight chamber therewith, and a fluid conductor communicating with each said chamber for connection with a source of subatmospheric pressure.

11. Molding apparatus comprising substantially concentric inner and outer forms, spacing means interposed between portions of said forms, each of said forms having a plurality of relatively movable wall sections defining a molding surface, means including a deformable gasket interposed between and abutting opposed portions of adjacent wall sections of each form defining a substantially fluid tight chamber therewith, and a fluid conductor communicating with each said chamber for connection with a source of subatmospheric pressure.

12. Molding apparatus as set forth in claim 11 wherein a divergent distributing member covers one end of said inner form while exposing a portion of the space between said forms.

References Cited in the file of this patent

UNITED STATES PATENTS

| | | |
|---|---|---|
| 1,000,427 | Miller | Aug. 15, 1911 |
| 1,278,479 | Kellar | Sept. 10, 1918 |
| 2,170,188 | Cobi | Aug. 22, 1939 |
| 2,375,148 | Terry | May 1, 1945 |
| 2,502,789 | James | Apr. 4, 1950 |
| 2,528,643 | Dubbs | Nov. 7, 1950 |
| 2,569,612 | Laurent | Oct. 2, 1951 |

FOREIGN PATENTS

| | | |
|---|---|---|
| 617,809 | France | Feb. 26, 1927 |

UNITED STATES PATENT OFFICE
CERTIFICATION OF CORRECTION

Patent No. 2,966,713                                January 3, 1961

Karl P. Billner

It is hereby certified that error appears in the above numbered patent requiring correction and that the said Letters Patent should read as corrected below.

Column 2, line 66, for "bending" read -- beading --.

Signed and sealed this 30th day of May 1961.

(SEAL)
Attest:

ERNEST W. SWIDER                                DAVID L. LADD

Attesting Officer                                     Commissioner of Patents